(12) United States Patent
Wyatt et al.

(10) Patent No.: US 8,190,937 B1
(45) Date of Patent: May 29, 2012

(54) METHOD AND SYSTEM FOR MANAGING THE POWER STATE OF AN AUDIO DEVICE INTEGRATED IN A GRAPHICS DEVICE

(75) Inventors: David Wyatt, San Jose, CA (US); Mark Pereira, Livermore, CA (US); Boon Sun Song, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 718 days.

(21) Appl. No.: 12/234,490

(22) Filed: Sep. 19, 2008

(51) Int. Cl.
*G06F 1/00* (2006.01)
*G06F 11/00* (2006.01)
*G06T 1/00* (2006.01)
*H04R 29/00* (2006.01)

(52) U.S. Cl. ............. 713/323; 381/58; 381/59; 714/450
(58) Field of Classification Search .................. 713/323; 714/450; 381/58–59; 345/522
See application file for complete search history.

(56) References Cited

U.S. PATENT DOCUMENTS

| | | | |
|---|---|---|---|
| 5,784,095 A * | 7/1998 | Robbins et al. .................. 725/49 |
| 5,787,259 A | 7/1998 | Haroun et al. | |
| 6,097,378 A | 8/2000 | Song | |
| 6,609,170 B1 | 8/2003 | Lehwalder et al. | |
| 6,609,977 B1 | 8/2003 | Shimizu et al. | |
| 6,700,586 B1 | 3/2004 | Demers | |
| 7,376,851 B2 | 5/2008 | Kim | |
| 7,447,918 B2 | 11/2008 | Dunstan et al. | |
| 7,690,006 B2 * | 3/2010 | Birnbaum et al. ............. 719/328 |
| 7,711,864 B2 * | 5/2010 | de Cesare et al. ................. 710/8 |
| 8,069,354 B2 * | 11/2011 | Min ............................... 713/300 |
| 2003/0063071 A1 * | 4/2003 | Wyatt ............................ 345/172 |
| 2006/0026318 A1 * | 2/2006 | Lee ................................. 710/72 |
| 2006/0222021 A1 * | 10/2006 | Ruff .............................. 370/522 |
| 2007/0283175 A1 * | 12/2007 | Marinkovic et al. .......... 713/320 |
| 2008/0034238 A1 * | 2/2008 | Hendry et al. ................ 713/323 |
| 2009/0063715 A1 * | 3/2009 | de Cesare et al. ................ 710/5 |
| 2009/0197640 A1 * | 8/2009 | Fa et al. ..................... 455/556.1 |
| 2009/0245521 A1 * | 10/2009 | Vembu et al. ................. 380/279 |
| 2010/0166193 A1 * | 7/2010 | Worrell et al. .................. 381/17 |

OTHER PUBLICATIONS

Office Action, U.S. Appl. No. 12/234,486 dated Jan. 3, 2012.
Burn et al.,: OSR's NTFSD List: Efficient Inter-Driver Communication; http://www.osronline.com/showThread.cfm?link=75471; dated May 2005; Retrieved Nov. 28, 2011.
Office Action dated Nov. 30, 2011 for U.S. Appl. No. 12/234,493.

* cited by examiner

*Primary Examiner* — Paul R Myers
*Assistant Examiner* — Christopher A Daley
(74) *Attorney, Agent, or Firm* — Patterson & Sheridan, LLP (57) ABSTRACT

One embodiment of the present invention sets forth a method for managing a power state of an audio device resident in a graphics processing unit. The method includes the steps of directing audio data originated from a client application via an audio path in an audio driver stack to the audio device, determining whether an active stream of audio data along the audio path is present in response to a notification of an attempt to shut down the graphics processing unit, and requesting a plug and play manager to disable the audio device, if no active stream of audio data is present along the audio path.

20 Claims, 7 Drawing Sheets

FIG. 7

METHOD AND SYSTEM FOR MANAGING THE POWER STATE OF AN AUDIO DEVICE INTEGRATED IN A GRAPHICS DEVICE

BACKGROUND OF THE INVENTION

1. Field of the Invention

Embodiments of the present invention generally relate to audio driver structures and, more specifically, to methods and systems for managing the power state of an audio device integrated in a graphics device.

2. Description of the Related Art

An increasing number of commercialized computer devices incorporate graphics-dedicated processing systems. In order to increase the processing throughput of the graphics system, multiple graphics processors may be provided in the graphics system. Such a multiprocessor graphics system may utilize a low performance graphics processor that reduces power usage at least in part by reducing graphics data processing performance, and a high performance graphics processor that offers greater graphics processing throughput, but contributes to increased power usage compared with the low power graphics processor. The increased graphics processing throughput may be achieved by operating at a higher clock rate, including two or more graphics processing pipelines, and using wider and/or faster internal and external interfaces. Moreover, to accommodate High-Definition ("HD") graphics and audio outputs, a HD audio device may also be integrated in the high performance graphics processor. As a result, the higher performance graphics processor is implemented in a larger die size than the lower performance graphics processor in order to include more transistors. Even when a high performance graphics processor is not processing graphics data, it contributes to overall system power consumption due to the static power resulting from transistor leakage. Therefore the static power of the high performance graphics processor is greater than the static power of the low power graphics processor. Consequently, high performance graphics processors are not used in conventional portable systems which are battery powered.

One conventional way to reduce power consumption in a battery powered mode is to turn off the high performance graphics processor. Unfortunately, the shutdown of the high performance graphics processor also removes power from any components related to the high performance graphics processor, such as the HD audio device. While the shutdown of the high performance graphics processor can be controllably performed through graphics drivers, there are no mechanisms in current operating systems to convey this shutdown event to the audio drivers that separately control the HD audio device. As a result, even if the HD audio device has been shut down, the audio drivers may still continue to send streams of audio data to the HD audio device, causing critical system faults.

As the foregoing illustrates, what is needed in the art is thus a system and method that are able to manage the power state of an audio device integrated in a graphics device in an effective manner and address at least the foregoing issues.

SUMMARY OF THE INVENTION

One embodiment of the present invention sets forth a method for managing a power state of an audio device resident in a graphics processing unit. The method includes the steps of directing audio data originated from a client application via an audio path in an audio driver stack to the audio device, determining whether an active stream of audio data along the audio path is present in response to a notification of an attempt to shut down the graphics processing unit, and requesting a plug and play manager to disable the audio device, if no active stream of audio data is present along the audio path.

One advantage of the disclosed method is the ability to disable the audio path before the graphics processing unit is actually shut down. Accordingly, streams of audio data no longer are sent to the audio device integrated in the graphics device after it is shut down. Critical system faults can thereby be prevented.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
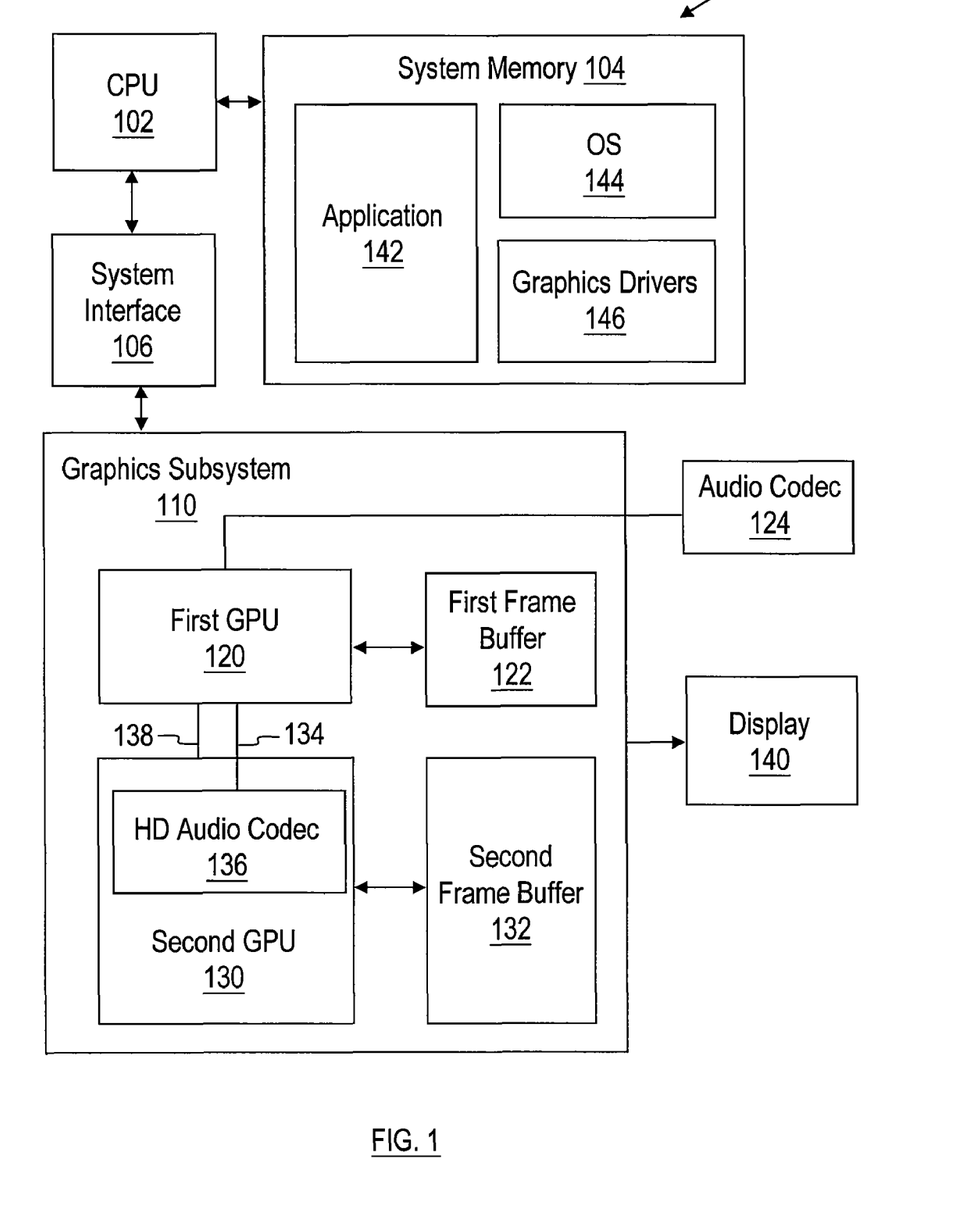
FIG. 1 is a diagram of a computer system adapted to implement one or more aspects of the present invention.

FIG. 1 is a simplified diagram of a computer system 100 adapted to implement one or more aspects of the present invention. The computer system 100 may be a desktop computer, server, laptop computer, palm-sized computer, tablet computer, game console, cellular telephone, hand-held device, computer-based simulator, or the like. The computer system 100 comprises a central processing unit ("CPU") 102, a system memory 104, a system interface 106, and a graphics subsystem 110. The CPU 102 connects to the system memory 104, and the graphics subsystem 110 via the system interface 106. The system interface 106 may include a system bus, a memory controller, Accelerated Graphics Port ("AGP"), Peripheral Component Interface Express ("PCIE") bus, and other industry standard interfaces adapted to couple the CPU 102 and the graphics subsystem 110.

In response to instructions transmitted by the CPU 102, the graphics subsystem 110 is configured to process graphics and/or audio data. In one embodiment, the graphics subsystem 110 comprises a first graphics processing unit ("GPU") 120 coupled to a first frame buffer 122 and an audio codec 124, and a second GPU 130 coupled to a second frame buffer 132. The first frame buffer 122 and the second frame buffer 132 store program instructions and graphics data respectively processed by the first and second GPU 120 and 130 to render images on a display device 140. While a single display device is shown, alternate embodiments may also connect multiple display devices to the graphics subsystem 110, each display device being associated with a different GPU, e.g., either the first GPU 120 or second GPU 130.

The first GPU 120 is a low power device, particularly well-suited for portable devices which may rely on battery power. The second GPU 130 is a high performance graphics device that consumes more power than the first GPU 120 and offers enhanced graphics performance including image quality features and/or higher graphics processing throughput, e.g., frame rate, fill rate, or the like. In one embodiment, the second GPU 130 may include a High-Definition Multimedia Interface (HDMI) adapted to transmit streams of High-Definition ("HD") graphics and audio data. HD audio streams may be processed in the graphics subsystem 110 via a HD audio codec 136 integrated in the second GPU 130 and connected to the first GPU 120 via a HD audio interface 134. In one embodiment, the HD audio interface can include, without limitation, the Azalia interface developed by Intel Corporation of Santa Clara, Calif. Furthermore, the first GPU 120 and the second GPU 130 may either work independently, or cooperate together through an interface 138 to render images on the display device 112. In some embodiments, when a low power condition occurs, e.g., when the computer system 100 relies on battery power, the second GPU 130 of higher graphics performance may also be controllably shut down to reduce power consumption. In this case, components that are associated with the second GPU 130, such as the second frame buffer 132 and the HD audio codec 136, are also controllably shut down to reduce power consumption.

Referring to FIG. 1 again, the system memory 104 contains an application program 142, an operating system ("OS") 144, and graphics drivers 146. During execution, the application program 142 may invoke various rendering functions of the graphics subsystem 110. One application program 142 may be, for example, a content player that provides graphics and/or audio content, and invokes appropriate functions of the graphics subsystem 110 to render the graphics and/or audio content for presentation on the display device 140. These rendering functions are invoked through the OS 144 that interacts with the graphics drivers 146 to process data and manage tasks performed on either of the first GPU 120 and the second GPU 130 for servicing the application program 142. In one embodiment, the OS 144 may include, for example, the Windows operating systems available from Microsoft® Corporation of Richmond, Wash. In addition, the graphics drivers 146 also work in conjunction with the OS 144 to manage the power state of the first GPU 120 and second GPU 130. In particular, the OS 144 may interact with the graphics drivers 146 to ensure that an audio path for audio output on the HD audio codec 136 is properly disabled when an attempt to shut down the second GPU 130 occurs.

Figure 2:
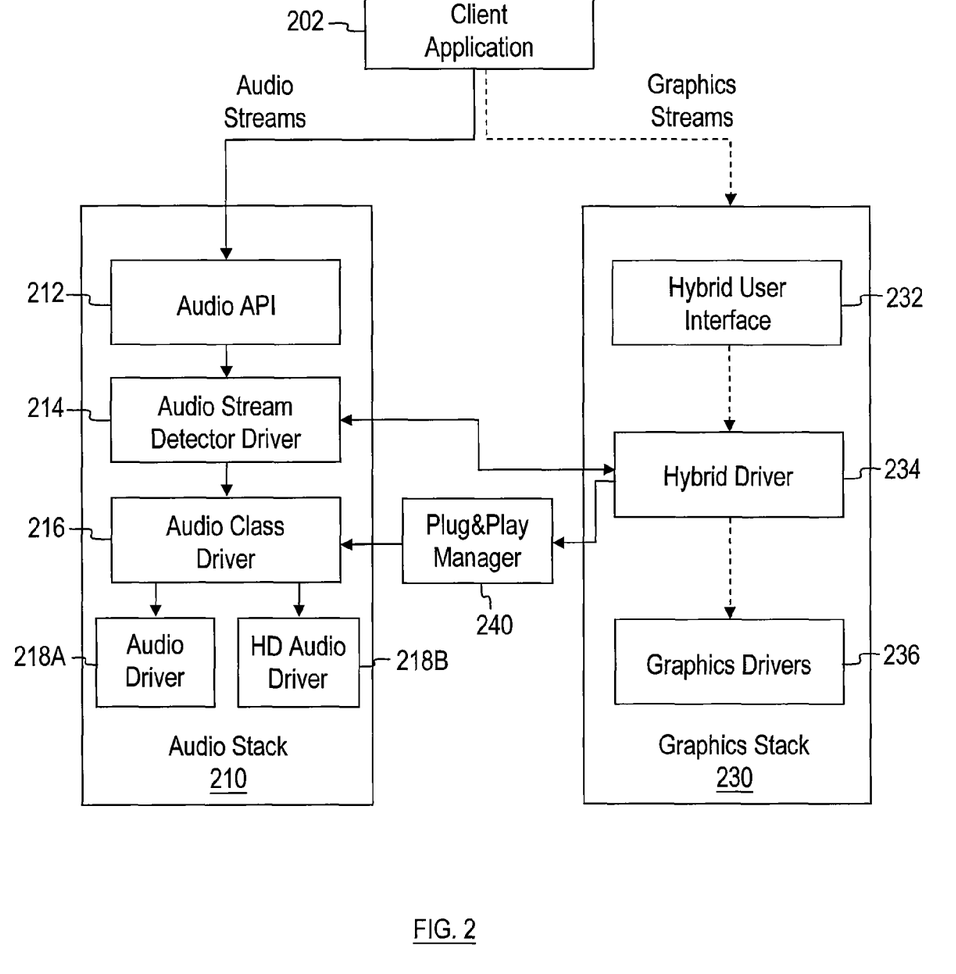
FIG. 2 is a schematic diagram illustrating how power management is implemented in an audio/graphics driver structure according to one embodiment of the present invention.

In conjunction with FIG. 1, FIG. 2 is a schematic diagram illustrating how power management is implemented in an audio/graphics driver structure according to one embodiment of the present invention. Streams of audio data generated by a client application 202 are processed in an independent manner through an audio-dedicated driver stack, i.e. the audio stack 210. The audio stack 210 comprises an audio application programming interface ("audio API") 212, an audio stream detector driver 214, an audio class driver 216, and one or more audio device driver, such as audio driver 218A and HD audio driver 218B. In one embodiment, the audio stack 210 may be provided with the OS 144 of FIG. 1. Moreover, the audio driver 218A is associated with the audio codec 124, whereas the HD audio driver 218B is associated with the HD audio codec 136. The client application 202 includes program calls to specific audio rendering functions defined by the audio API 212. In one embodiment, the audio API 212 may include, for example, the DirectSound API provided with the Windows operating systems. The audio API 212 interacts with the audio class driver 216 to perform the tasks defined by the audio rendering functions. Based on the selected audio codec for audio output, the audio class driver 216 may access either of the audio driver 218A or HD audio driver 218B to have the audio stream outputted on the proper audio codec. According to the selected audio output, a stream of audio data in the audio stack 210 can thus be processed along a particular audio path through either the audio driver 218A or the HD audio driver 218B. The presence of an active audio stream in the audio stack 210 is detected by the audio stream detector driver 214, which also identifies the client application 202 from which the stream of audio data originates.

In some embodiments, the client application 202 may also generate graphics data. Streams of graphics data are processed through a separate graphics-dedicated driver stack, i.e. the graphics stack 230. The graphics stack 230 comprises a hybrid user interface 232, a hybrid driver 234 and graphics drivers 236. The hybrid driver 234 is responsible for power management of the first GPU 120 and second GPU 130, and is able to receive inputs from a user through the hybrid user interface 232. More particularly, in one embodiment, the hybrid driver 234 may modify a power state of the second GPU 130 in response to a user's request inputted via the hybrid user interface 232, or based on the detection of a change in the power supply mode of the computer system. The power state of the second GPU 130 may be modified by switching the second GPU 130 either from a power-on state to a power-off state or reversely from a power-off state to a power-on state. When an attempt to modify the power state of the second GPU 130 occurs, the hybrid driver 234 is configured to interact with the audio stream detector driver 214 and a plug and play manager 240 to either disable or enable an audio path through the HD audio driver 218B.

Figure 3:
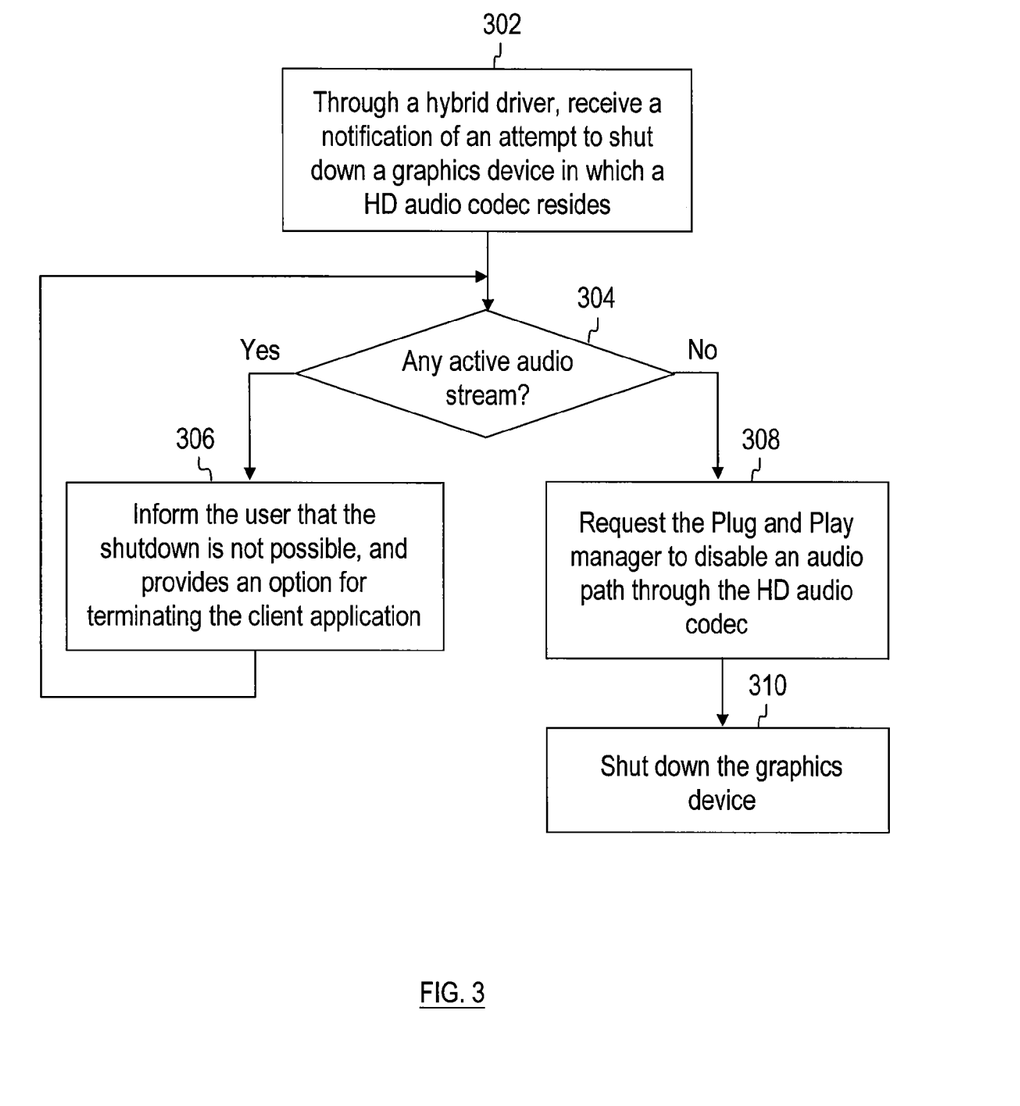
FIG. 3 is a flowchart of method steps for disabling an audio path in the audio/graphics driver structure of FIG. 2 in response to an attempt to shut down a graphics device, according to one embodiment of the present invention.

In conjunction with FIGS. 1 and 2, FIG. 3 is a flowchart of method steps for disabling an audio path in the audio stack 210 for audio output on the HD audio codec 136, when an attempt to shut down the second GPU 130 occurs. In initial step 302, the hybrid driver 234 is notified of an attempt to shut down the second GPU 130. In subsequent step 304, the hybrid driver 234 queries the audio stream detector driver 214 to determine whether an active stream of audio data is being processed through the HD audio driver 218B, and identify the client application 202 from which the audio data originates. When an active stream of audio data is present, the hybrid driver 234 issues an alert, for example through the hybrid user interface 232, informing the user that the shutdown attempt is not possible, and provides an option for terminating the client application 202. Subsequently, step 304 may then be repeated to detect again whether an active stream of audio data is present.

When no active stream of audio data is processed through the HD audio driver 218B, the hybrid driver 234 in step 308 requests the plug and play manager 240 to disable the HD audio driver 218B. The plug and play manager 240 may then send requests to the audio class driver 216 to remove the software representation of the HD audio codec 136 and unload the associated HD audio driver 218B. The audio path for output on the HD audio codec 136 is thereby effectively disabled. In step 310, the second GPU 310 can then be properly shut down.

By using the functions of the plug and play manager 240, the above-described embodiment proposes a convenient mechanism for disabling a desired audio path without modification of the audio stack 210.

Figure 4:
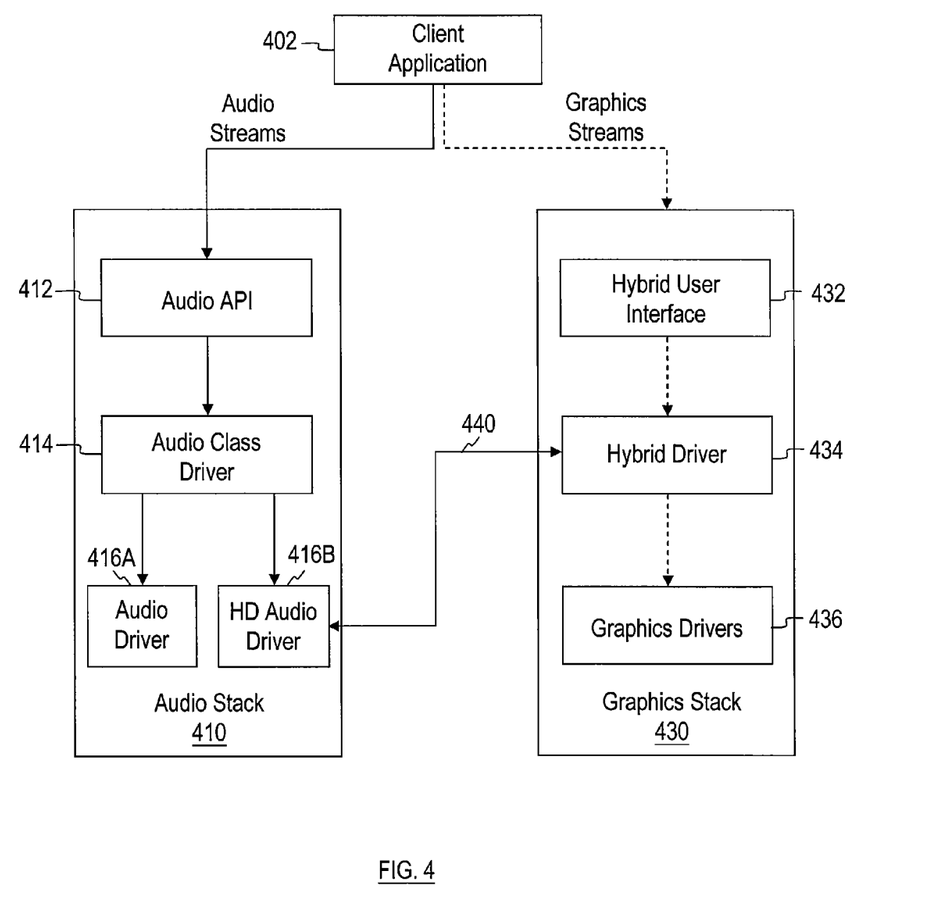
FIG. 4 is a schematic diagram illustrating how power management is implemented in an audio/graphics driver structure according to another embodiment of the present invention.

FIG. 4 is a schematic diagram illustrating how power management is implemented in an audio/graphics driver structure when an attempt to shut down the second GPU 130 occurs, according to another embodiment of the present invention. Like the previous embodiment, streams of audio data originated from a client application 402 are processed through a dedicated audio stack 410 that comprises an audio API 412, an audio class driver 414, and one or more audio device driver, such as audio driver 416A and HD audio driver 416B. In one embodiment, the audio driver 416A is associated with the audio codec 124 in the computer system 100 of FIG. 1, whereas the HD audio driver 416B is associated with the HD audio codec 136. Likewise, for processing streams of graphics data, a dedicated graphics stack 430 comprises a hybrid user interface 432, a hybrid driver 434 and graphics drivers 436. In addition, the hybrid driver 434 is also coupled to the HD audio driver 416B via a private interface 440 for coordinating the output of graphics and audio streams through the second GPU 130. In one embodiment, the private interface 440 can include a set of shared registers accessible by the hybrid driver 234 and the HD audio driver 416B. These shared registers may be used to reflect, for example, certain states of the first GPU 120 and second GPU 130. In alternate embodiments, the private interface 440 may also use other communication links, including software links, to enable communication between other level components in the audio stack 410 and the graphics stack 430.

Figure 5:
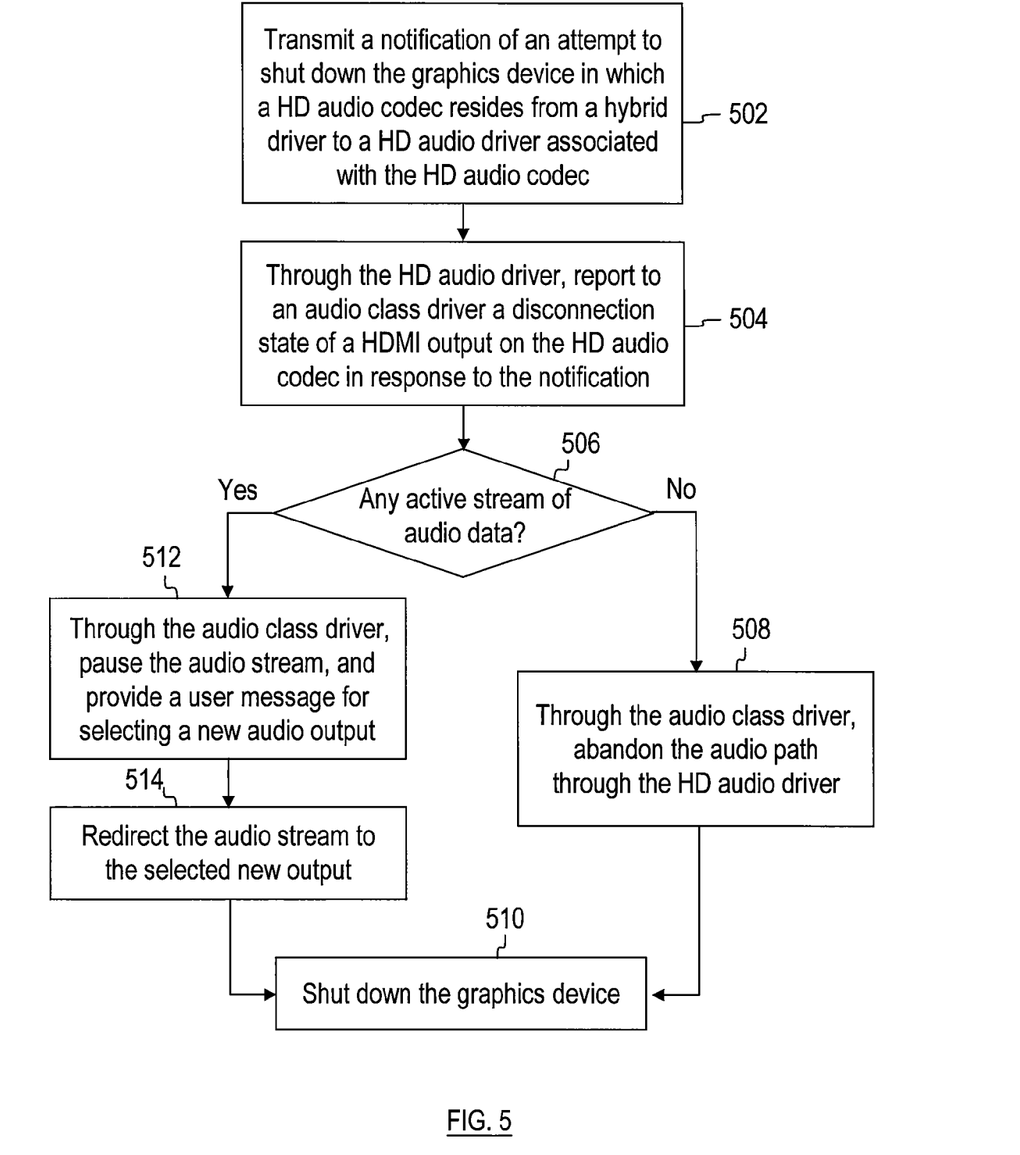
FIG. 5 is a flowchart of method steps for disabling an audio path in the audio/graphics driver structure of FIG. 4 in response to an attempt to shut down a graphics device, according to one embodiment of the present invention.

In conjunction with FIG. 4, FIG. 5 is a flowchart of method steps for disabling an audio path in the audio stack 410 for audio output on the HD audio codec 136, when an attempt to shut down the second GPU 130 occurs. In initial step 502, the hybrid driver 434 transmits via the private interface 440 to the HD audio driver 416B a notification of an attempt to shut down the second GPU 130. In response to the notification, the HD audio driver 416B in step 504 is configured to report to the audio class driver 414 a simulated disconnection event of a HDMI connector enumerated on the HD audio codec 136. As a consequence, step 506 is performed to determine whether an active stream of audio data is currently processed through the HD audio driver 416B. When no audio streams are processed, the audio class driver 414 in step 508 proceeds to abandon the audio path through the HD audio driver 416B. The second GPU 130 can then be properly shut down in step 510.

On the other hand, when an active stream of audio data is currently processed through the HD audio driver 416B, the audio class driver 414 in step 512 pauses the stream of audio data, and provides a message to the user for selecting a new audio output. In step 514, the audio class driver 414 then redirects the stream of audio data to the selected new audio output. In one embodiment, the stream of audio data may be redirected through, for example, the audio driver 416A for output on the audio codec 124 of the computer system 100 shown in FIG. 1. Eventually, the second GPU 130 can then be properly shut down in step 510.

Similarly, when the second GPU 130 is switched on, the HD audio driver 416B will recognize a connection event of a HDMI connector enumerated on the HD audio codec 136. The associated audio path can then be restored.

Figure 6:
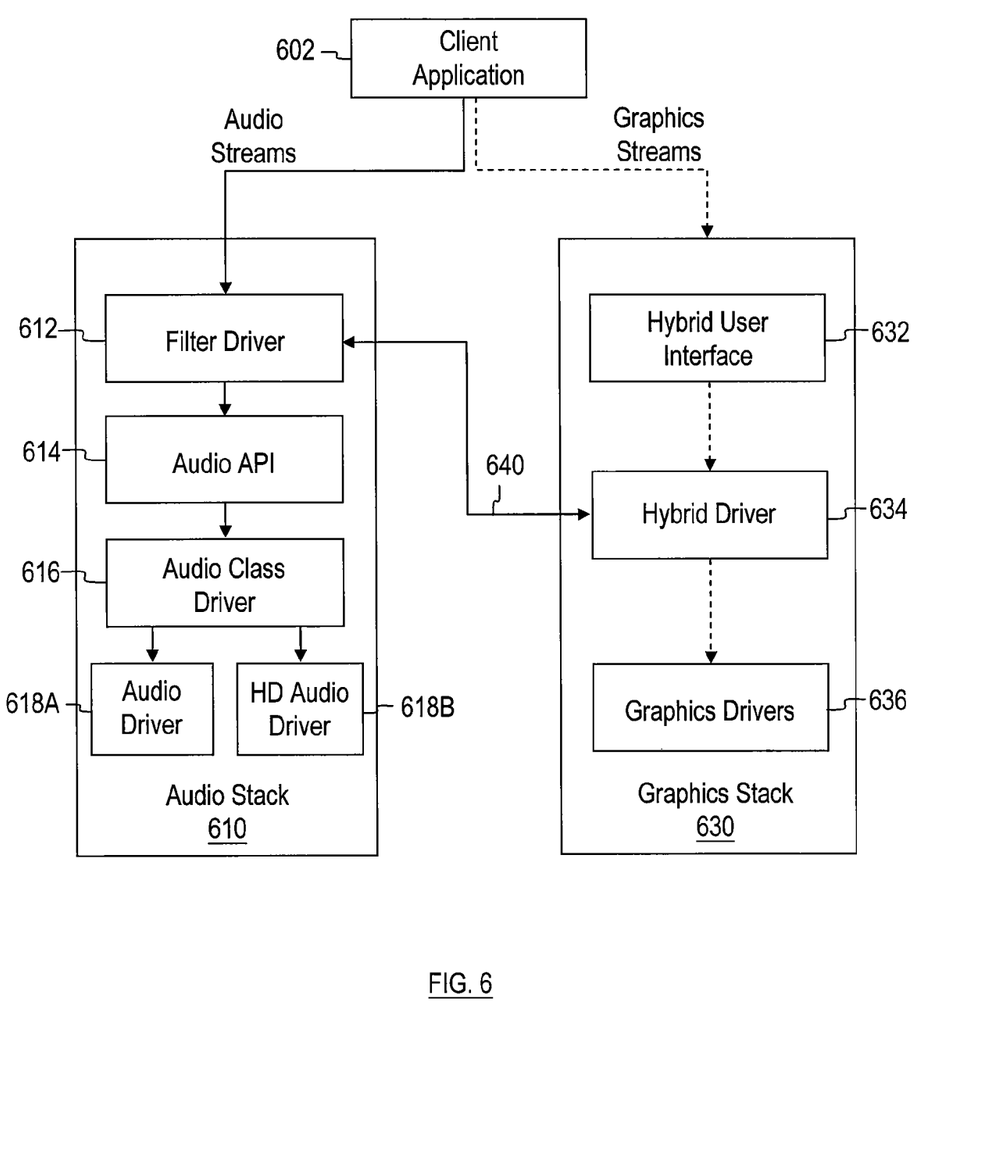
FIG. 6 is a schematic diagram illustrating how power management is implemented in an audio/graphics driver structure according to yet another embodiment of the present invention.

FIG. 6 is a schematic diagram illustrating how power management is implemented in an audio/graphics driver structure when an attempt to shut down the second GPU 130 occurs, according to yet another embodiment of the present invention. An audio stack 610 for processing audio data originated from a client application 602 comprises a filter driver 612, an audio API 614, an audio class driver 616, and one or more audio device driver, such as audio driver 618A and HD audio driver 618B. In one embodiment, the audio driver 618A is associated with the audio codec 124, whereas the HD audio driver 618B is associated with the HD audio codec 136. Like previously described embodiments, a graphics stack 630 for processing graphics data is also provided, comprising a hybrid user interface 632, a hybrid driver 634 and graphics drivers 636. One feature of this embodiment is the addition of the filter driver 612 in the audio stack 610. The filter driver 612 is able to communicate with the hybrid driver 634 in the graphics stack 630 through a private interface 640, and select an audio path for processing a stream of audio data issued from the client application 602.

Figure 7:
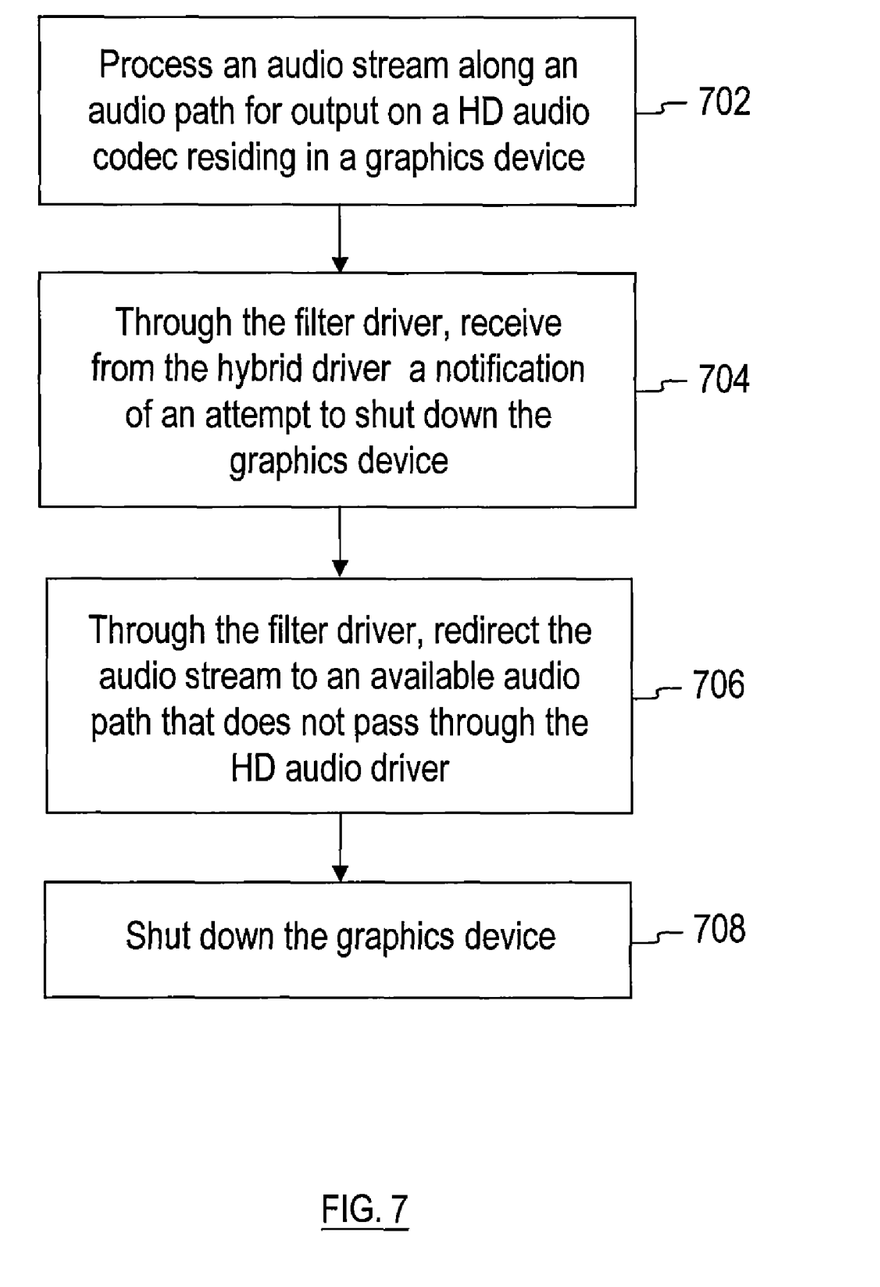
FIG. 7 is a flowchart of method steps for disabling an audio path in the audio/graphics driver structure of FIG. 6 in response to an attempt to shut down a graphics device, according to one embodiment of the present invention.

In conjunction with FIG. 6, FIG. 7 is a flowchart of method steps for disabling an audio path in the audio stack 610 for output on the HD audio codec 136, when an attempt to switch off the second GPU 130 occurs. In initial step 702, the filter driver 612 may select the audio path that passes through the HD audio driver 618B for processing a stream of audio data issued to be outputted on the HD audio codec 136. In step 704, the filter driver 612 receives a notification transmitted by the hybrid driver 634 via the private interface 640 indicating an attempt to shut down the second GPU 130. As a consequence, in step 706, the filter driver 612 selects a new audio path, such as the audio path for output on the audio codec 124, and redirects the stream of audio data previously processed through the HD audio driver 618B to the new audio path. Eventually, the second GPU 130 can then be properly shut down in step 708.

By disabling the concerned audio path in anticipation of the shutdown of the second GPU, streams of audio data are no longer sent to the HD audio device integrated in the second GPU after it is shut down. As a result, critical system faults can be prevented.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

We claim:

1. A method for managing a power state of an audio device resident in a graphics processing unit, the method comprising:
   directing audio data originated from a client application via an audio path in an audio driver stack to the audio device;
   in response to a notification of an attempt to shut down the graphics processing unit, reporting a disconnection event of an output on the audio device; and
   abandoning the audio path to the audio device.

2. The method of claim 1, further comprising redirecting the audio data via a second audio path in the audio driver stack to a second audio device.

3. The method of claim 2, further comprising requesting a user to select the second audio path.

4. The method of claim 1, further comprising switching off the graphics processing unit after the audio path has been abandoned.

5. The method of claim 1, wherein the audio path comprises an application programming interface, an audio class driver, and an audio device driver.

6. The method of claim 5, wherein the step of reporting the disconnection event of the output on the audio device is performed by the audio device driver.

7. The method of claim 6, wherein the notification of the attempt to shut down the graphics processing unit is issued from a graphics driver component to the audio device driver via a private interface.

8. The method of claim 1, wherein the audio device comprises a High-Definition audio codec.

9. A computer-readable medium containing a sequence of instructions for managing a power state of an audio device resident in a graphics processing unit, which when executed by a processor in a computer system, causes the processor to:
   direct audio data originated from a client application via an audio path in an audio driver stack to the audio device;
   in response to a notification of an attempt to shut down the graphics processing unit, report a disconnection event of an output on the audio device; and
   abandon the audio path to the audio device.

10. The computer-readable medium of claim 9, further containing a sequence of instructions, which when executed by the processor, causes the processor to redirect the audio data via a second audio path in the audio driver stack to a second audio device.

11. The computer-readable medium of claim 10, further containing a sequence of instructions, which when executed by the processor, causes the processor to request a user to select the second audio path.

12. The computer-readable medium of claim 9, further containing a sequence of instructions, which when executed by the processor, causes the processor to switch off the graphics processing unit after the audio path has been abandoned.

13. The computer-readable medium of claim 9, wherein the audio path comprises an application programming interface, an audio class driver, and an audio device driver.

14. The computer-readable medium of claim 13, further containing a sequence of instructions for the audio device driver, which when executed by the processor, causes the processor to report the disconnection event of the output on the audio device.

15. The computer-readable medium of claim 14, wherein the notification of the attempt to shut down the graphics processing unit is issued from a graphics driver component to the audio device driver via a private interface.

16. The computer-readable medium of claim 9, wherein the audio device comprises a High-Definition audio codec.

17. A computer system capable of managing a power state of an audio device, the computer system comprises:
   a processor;
   a system memory; and
   a graphics processing unit in which the audio device resides, wherein the processor is configured to
      direct audio data originated from a client application via an audio path in an audio driver stack to the audio device;
      in response to a notification of an attempt to shut down the graphics processing unit, report a disconnection event of an output on the audio device; and
      abandon the audio path to the audio device.

18. The computer system of claim 17, wherein the processor is further configured to redirect the audio data via a second audio path in the audio driver stack to a second audio device.

19. The computer system of claim 18, wherein the processor is further configured to request a user to select the second audio path.

20. The computer system of claim 17, wherein the processor is further configured to switch off the graphics processing unit after the audio path has been abandoned.

* * * * *